Patented Oct. 9, 1945

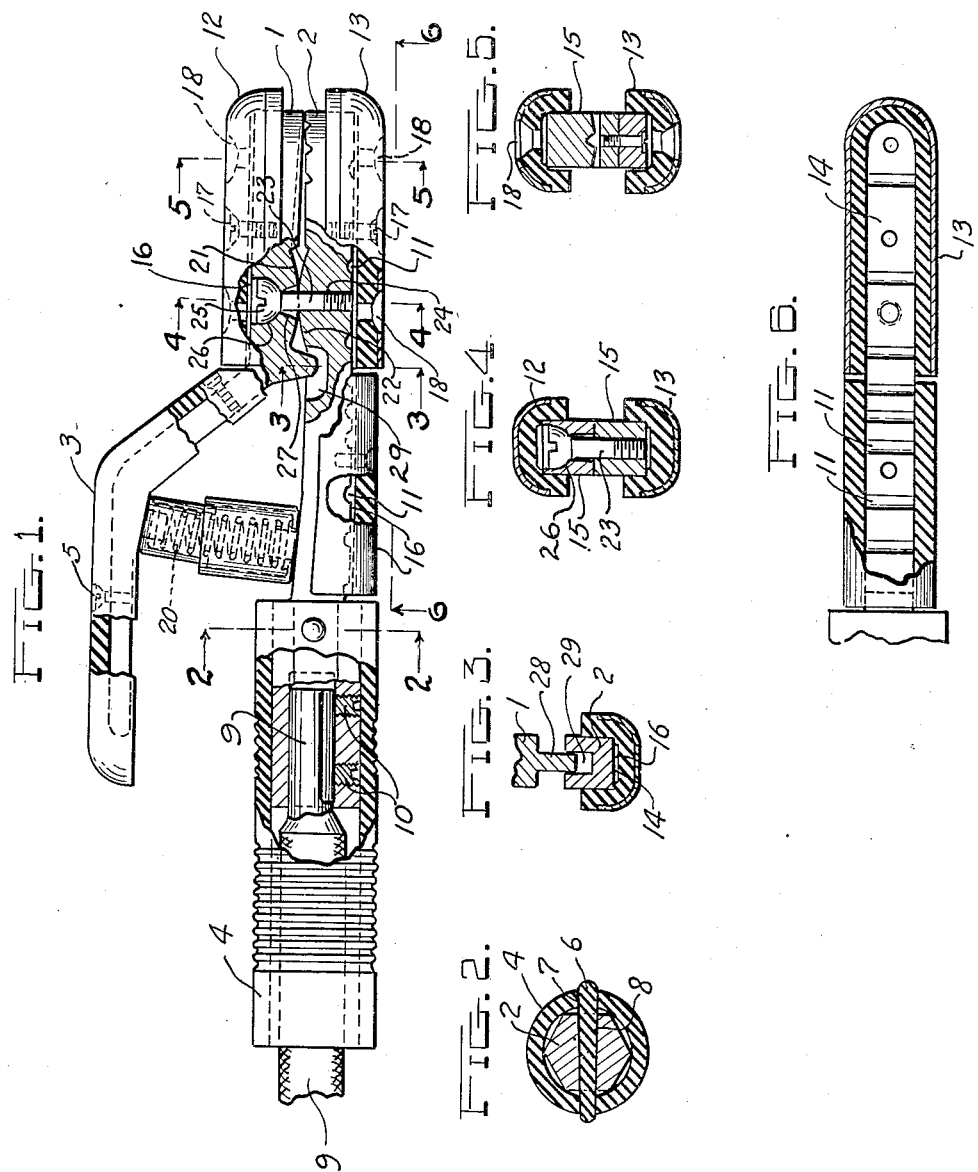
Oct. 9, 1945. H. A. JACKSON 2,386,399
WELDING ELECTRODE HOLDER
Filed Feb. 18, 1944
Honel A. Jackson
INVENTOR.

2,386,399

UNITED STATES PATENT OFFICE 2,386,399

WELDING ELECTRODE HOLDER

Honel A. Jackson, Detroit, Mich.

Application February 18, 1944, Serial No. 522,868

8 Claims. (Cl. 219—8)

This invention relates to a welding electrode holder and more particularly to a holder for arc welding electrodes.

It is the object of this invention to produce a holder particularly adapted for arc welding electrodes which is more efficient, longer lived and cooler in operation than electrode holders heretofore known.

This invention also contemplates a jaw type of arc welding electrode holder having a pivotal connection between the jaws which will not be injured or burned out by shorting or accidentally striking an arc from the holder in the area of the pivot. This result is accomplished by pivoting the jaws together by a pivotal connection positioned within the side faces of the jaws and interiorally of the jaws so that the jaws themselves serve as a protection for the pivotal connection.

In the drawing:

Fig. 1 is a side elevation partly in section showing my new type of electrode holder.

Figs. 2, 3, 4 and 5 are sections along the lines 2—2, 3—3, 4—4 and 5—5 of Fig. 1.

Fig. 6 is a fragmentary view partly in section taken along the line 6—6 of Fig. 1.

Referring more particularly to the drawing, the electrode holder comprises jaws 1 and 2 made from any suitable metal such as copper, aluminum, steel, or their alloys.

Jaw 1 is provided with a handle 3 of channel cross section and jaw 2 is provided with a tubular handle 4. Handles 3 and 4 are each made of electrical and heat insulating material capable of withstanding high impact, such as Bakelite or other heat resisting plastic or Bakelite molded about reinforcing fabric such as canvas. Handle 3 is secured to jaw 1 by screws 5 and handle 4 is secured on jaw 2 by a tapered pin 6 of Bakelite or other insulating material which is driven into and has a tight fit in openings 7 in handle 4 and opening 8 in jaw 2. Current is conducted to jaw 2 by means of cable 9 which is fixed in the end of jaw 2 by screws 10.

The outside faces 14 of jaws 1 and 2 opposite the electrode engaging faces are each provided with a plurality of transverse grooves 11 which serve to increase the heat radiating surface of the jaws and materially assist in air cooling of the same. Insulating covers 12 and 13 of channel section are also provided for jaws 1 and 2 respectively. These insulating covers 12 and 13 can be made from Bakelite or any other suitable electrical and heat insulating material capable of withstanding high impact. The covers 12 and 13 extend over and partially cover the side faces 15 of the jaws. A clearance or space 16 is provided between the outside faces 14 of jaws 1 and 2 and the inside or bottom faces of covers 12 and 13. Covers 12 and 13 are secured to their respective jaws by screws 17. The heads of all screws which secure the insulating covers to the jaws fit into countersunk openings and are sealed over with an insulating material. Covers 12 and 13 are each provided with openings 18 which communicate with opposite ends of air space or clearance 16 and thereby permit air to circulate in and through openings 18 and space 16 over the outer grooved faces 14 of the jaws for cooling the same.

A coil spring 20 is provided between jaws 1 and 2 for closing the same.

Jaws 1 and 2 are provided with bearing portions 21 and 22 which contact and rock or slide one relatively upon the other in the opening and closing of the holder jaws. The jaws are pivoted together by means of a screw 23 which is screwed into a threaded opening 24 in jaw 2 and has a hemispherical head 25 which is journaled in a hemispherical socket 26 in jaw 1. A clearance 27 is provided in jaw 1 about the stem of screw 23 to permit pivoting of jaw 1 on jaw 2.

To maintain the jaws in longitudinal alignment, jaw 1 is provided with a tongue 28 which has a sliding fit in groove 29 in jaw 2. A small clearance is provided between tongue 28 and the sides of groove 29. However, tongue 28 cooperates with groove 29 to keep jaws 1 and 2 aligned one above the other and prevent jaw 1 from swivelling about screw 23 as an axis.

Screw 23 can be turned down so that bearing portions 21 and 22 have a neat sliding contact one upon the other at all times or, if preferred, screw 23 can be screwed into jaw 2 so that there is a small clearance between bearing faces 21 and 22.

Jaw 1 can be readily disassembled from jaw 2 by simply removing cover 12 and thereupon turning screw 23 out of jaw 2.

A welding electrode or rod can be readily inserted between jaws 1 and 2 by pressing handle 3 toward handle 4 against compression spring 20 which causes jaw 1 to pivot about pivot 25, 26 while guided by tongue and groove 28, 29 to thereby open the jaws forward or to the right of pivot screw 23 so that an electrode can be inserted between the jaws and tightly gripped therebetween upon releasing handle 3.

I claim:

1. In a holder for welding electrodes, the combination comprising jaws adapted to grip an electrode therebetween, a pivotal connection between said jaws in the form of a socket extending inwardly from the outer face of one of said jaws and spaced longitudinally from the outer end of the jaw and positioned entirely within the side faces of the jaw, an opening extending outwardly from the inner face of said jaw and communicating with said socket, and a pivot member extending through said socket and opening and secured to the other jaw between the side faces of said other jaw and pivotally bearing in the socket of the first mentioned jaw whereby the jaws can be swung about said pivotal connection to open the same for reception of an electrode, said pivot member extending substantially perpendicular to the axis of pivoting of said jaws.

2. In a holder for welding electrodes, the combination comprising jaws adapted to grip an electrode therebetween, a pivotal connection between said jaws in the form of a socket extending inwardly from the outer face of one of said jaws and spaced longitudinally from the outer end of the jaw and positioned entirely within the side faces of the jaw, an opening extending outwardly from the inner face of said jaw and communicating with said socket, a pivot member extending through said socket and opening and secured to the other jaw between the side faces of said other jaw and pivotally bearing in the socket of the first mentioned jaw whereby the jaws can be swung about said pivotal connection to open the same for reception of an electrode, said pivot member extending substantially perpendicular to the axis of pivoting of said jaws, and resilient means tending at all times to close said jaws.

3. In a holder for welding electrodes, the combination comprising jaws adapted to grip an electrode therebetween, a pivotal connection between said jaws in the form of a concave socket extending inwardly from the outer face of one of said jaws and spaced longitudinally from the electrode receiving end of said jaw, an opening extending outwardly from the inner face of said jaw and communicating with said socket, and a convex bearing member journalled in the said socket and having a portion passing through said opening and fixed to the other jaw, the said pivotal connection being positioned within the side faces of said jaws.

4. In a holder for welding electrodes, the combination comprising jaws adapted to grip an electrode therebetween, a pivotal connection between said jaws in the form of a concave socket extending inwardly from the outer face of one of said jaws and spaced longitudinally from the electrode receiving end of said jaw, an opening extending outwardly from the inner face of said jaw and communicating with said socket, and a convex bearing member journalled in the said socket and having a portion passing through said opening and fixed to the other jaw, the said pivotal connection being positioned within the side faces of said jaws, and a tongue on one of said jaws and spaced lengthwise of the jaw from said bearing member and a groove in the other of said jaws for receiving and guiding said tongue whereby the said jaws are maintained in longitudinal alignment.

5. In a holder for welding electrodes, the combination comprising jaws adapted to grip an electrode therebetween, a hemispherical socket in, and extending inwardly from, the outer face of one of said jaws, an opening extending outwardly from the inner face of said jaw and communicating with said socket, and a hemispherical bearing member having a stem portion passing through said opening and fixed to the other of said jaws, said bearing member being journalled in said socket for pivoting the said jaws together, and means for keeping said jaws in longitudinal alignment.

6. In a holder for welding electrodes, the combination comprising jaws adapted to grip an electrode therebetween, a hemispherical socket in, and extending inwardly from, the outer face of one of said jaws, an opening leading from the hemispherical socket to the inner face of said jaw, a stud having a hemispherical head fixed to the other jaw with the stem of the stud passing through the said opening substantially perpendicular to the axis of pivoting and the hemispherical head of the stud bearing in said socket whereby the said jaws are pivotally connected together, and guide means between the said jaws in the form of a tongue on one jaw projecting into a groove in the other jaw for keeping the same in longitudinal alignment, said tongue and groove being in longitudinal alignment with said stud.

7. In a holder for welding electrodes, the combination comprising jaws adapted to grip an electrode therebetween, opposed convex bearing portions on said jaws upon which one jaw pivots relative to the other, a hemispherical socket in, and extending inwardly from, the outer face of one of said jaws, an opening between the socket and the inner face of said jaw, a threaded stud having a hemispherical head screwed into a threaded opening in the other jaw with the head of said stud bearing in the hemispherical socket and the stem passing through the opening between the socket and the inner face of the jaw, the said socket and stud being positioned between the side faces of said jaws, the said stud extending substantially perpendicular to the axis about which the jaws pivot.

8. In a holder for welding electrodes, the combination comprising jaws adapted to grip an electrode therebetween, opposed convex bearing portions on said jaws upon which one jaw pivots relative to the other, a hemispherical socket in, and extending inwardly from, the outer face of one of said jaws, an opening between the socket and the inner face of said jaw, a threaded stud having a hemispherical head screwed into a threaded opening in the other jaw with the head of said stud bearing in the hemispherical socket and the stem passing through the opening between the socket and the inner face of the jaw, the said socket and stud being positioned between the side faces of said jaws, the said stud extending substantially perpendicularly to the faces of the jaws which grip the electrode, and a tongue on one of said jaws and a groove in the other of said jaws into which said tongue projects for keeping the jaws in longitudinal alignment.

HONEL A. JACKSON.